United States Patent
Agrawal et al.

(10) Patent No.: US 7,006,440 B2
(45) Date of Patent: Feb. 28, 2006

(54) AGGREGATE FAIR QUEUING TECHNIQUE IN A COMMUNICATIONS SYSTEM USING A CLASS BASED QUEUING ARCHITECTURE

(75) Inventors: Sanjay K. Agrawal, San Jose, CA (US); Neil N. Mammen, San Jose, CA (US); Ajit Ninan, San Jose, CA (US); Jason C. Fan, Mountain View, CA (US)

(73) Assignee: Luminous Networks, Inc., Cupertino, CA (US)

( * ) Notice: Subject to any disclaimer, the term of this patent is extended or adjusted under 35 U.S.C. 154(b) by 929 days.

(21) Appl. No.: 10/047,638

(22) Filed: Oct. 26, 2001

(65) Prior Publication Data

US 2003/0081546 A1 May 1, 2003

(51) Int. Cl.
*H04L 12/26* (2006.01)
(52) U.S. Cl. .................................... 370/235
(58) Field of Classification Search ............... 370/230, 370/231, 232, 235, 412
See application file for complete search history.

(56) References Cited

U.S. PATENT DOCUMENTS

| | | | | | |
|---|---|---|---|---|---|
| 5,926,459 | A | * | 7/1999 | Lyles et al. ................. | 370/230 |
| 6,167,445 | A | * | 12/2000 | Gai et al. ..................... | 709/223 |
| 6,188,698 | B1 | * | 2/2001 | Galand et al. ............... | 370/412 |
| 6,515,963 | B1 | * | 2/2003 | Bechtolsheim et al. ..... | 370/229 |
| 6,829,649 | B1 | * | 12/2004 | Shorey et al. ............... | 709/235 |
| 6,901,593 | B1 | * | 5/2005 | Aweya et al. ................ | 718/104 |
| 2004/0095935 | A1 | * | 5/2004 | Connor ........................ | 370/392 |
| 2004/0156380 | A1 | * | 8/2004 | Silverman et al. .......... | 370/428 |
| 2004/0233845 | A1 | * | 11/2004 | Jeong et al. ................. | 370/230 |
| 2005/0141426 | A1 | * | 6/2005 | Hou ............................ | 370/235 |

\* cited by examiner

*Primary Examiner*—Melvin Marcelo
(74) *Attorney, Agent, or Firm*—Sawyer Law Group LLP

(57) ABSTRACT

A communications network is described having a class-based queuing architecture. Shared class queues receive packet flows from different customers. In one embodiment, there are eight classes and thus eight shared queues, one for each class. A scheduler schedules the output of packets by the various queues based on priority. Each customer (or other aggregate of packet flows) is allocated a certain space in a class queue based on the customers' Service Level Agreement (SLA) with the service provider. A queue input circuit detects bits in the packet header identifying the customer (or other criteria) and makes selections to drop or pass packets destined for a shared queue based on the customers' (or other aggregates') allocated space in the queue. In another embodiment, the relative positions of the nodes in the network are taken into account by each node when dropping packets forwarded by other nodes by detecting a node label (or other ID code) so that packets from the various nodes are dropped in a more fair way when there is congestion in the network, irrespective of the "passing " node's position relative to the other nodes.

34 Claims, 9 Drawing Sheets

AGGREGATE FAIR QUEUING TECHNIQUE IN A COMMUNICATIONS SYSTEM USING A CLASS BASED QUEUING ARCHITECTURE

FIELD OF THE INVENTION

This invention relates to communications networks and, in particular, to a queue management mechanism for servicing traffic while controlling traffic congestion in a shared class-of-service queue.

BACKGROUND

In networks such as enterprise, Metro-Area, and Wide-Area networks, most of the network topologies consist of meshes and rings. These networks are expected to support a quality of service (QoS), pursuant to Service Level Agreements (SLAs) between the customers and the service provider, required to support voice, video, and data applications.

Traditional networks, such as ATM, use "per flow" management. A flow is a TCP/UDP connection that is uniquely defined by the following fields: IP source address, IP destination address, protocol number (TCP/UDP), TCP/UDP source port number, and destination port number. Each flow consists of one or more packets requiring the same connection. Each flow is managed by queuing the packets in the flow and scheduling the transmission of the flow through the network. The flows are given various priority levels depending upon the customer's Service Level Agreements, which determine whether the flows are delayed or dropped when there is congestion in the network or within the source node itself. This per flow management provides end-to-end bandwidth guarantees while maintaining per flow shaping and leads to minimum de-jittering delay at the end receiver. Network flows are extremely short lived (60% are less than five packets long) and extremely dynamic in nature.

In high-end routers, which process as many as fifty million packets per second, it is very costly (in terms of processing time) to separately schedule millions of flows that traverse through the backbone nodes. Further, maintaining millions of queues and scheduling each queue according to a fair queuing mechanism is very expensive. And, using the protocol layer to process per flow signaling messages is computationally very expensive.

To increase the effective length of a flow, the flows may be aggregated by customer, node, Multiple Protocol Label Switching (MPLS) label, or any other aggregate. An aggregation of flows is typically designated by a common ID or label in the packets' headers, depending on what type of flows are to be aggregated, such as flows by a single customer or a single node. This reduces the number of queues somewhat but still would result in a router needing to support queuing and scheduling of millions of queues.

In contrast to per flow queuing and scheduling, class based queuing networks have emerged. A class is basically a level of priority of a packet. Such class based queuing is advantageous because of its scalability and seamless integration with IP network protocols. Class based models scale well because the number of classes supported (typically eight) remains constant while the link rate increases. The class of a packet is designated in a field in the IP header of a package. The flows are aggregated according to their class and are queued and scheduled according to the class.

The highest class is for voice traffic (and other high priority traffic) whose packets cannot be delayed or delivered out of sequence. The lowest class is best-effort service. Other classes include various levels of delay insensitive services having committed bandwidth allocations and over-committed bandwidth allocations. The customers subscribe to particular classes and bandwidths, where the higher classes and bandwidths are more expensive.

When the network becomes congested, packets within classes that guarantee a particular bandwidth to the customers do not get dropped. The packets in the lower classes (e.g., over-committed classes) are dropped in accordance with various algorithms due to the congestion.

Multiple customers may share the same class queue in a router. Some customers sharing a class queue have Service Level Agreements with the service provider that provide for a bandwidth allocation that is greater than the bandwidth allocation provided for other customers sharing the class. In such cases, bandwidth degradation is controlled by dropping packets in accordance with various algorithms. However, in the prior art, the dropping of packets in a certain class due to congestion is not dependent on the particular customer associated with the packets. Therefore, although a certain customer has paid for a higher bandwidth, that customer's packets are just as likely to be dropped by the shared class queue as packets for a customer that has paid for less bandwidth. This is an unfair situation to the customer who has paid for a larger bandwidth.

What is needed is a more fair technique to drop packets in class based queuing.

SUMMARY

A communications network is described having a class-based queuing architecture. Shared class queues receive packet flows from different customers. In one embodiment, there are eight classes and thus eight shared queues, one for each class. A scheduler schedules the output of packets by the various queues based on priority.

When there is congestion in the network, packets destined for the lower class queues, having a lower priority, must be dropped (or otherwise congestion controlled) because the scheduler allows the queue fill up by allowing higher class queues to use the network resources. In certain embodiments, the packets destined for the lower class queues are algorithmically dropped during a congestion situation prior to the shared queues overflowing.

In contrast to prior art techniques where packets destined for a shared queue of a certain class are dropped irrespective of the particular customer associated with the packets, one embodiment of the present invention detects bits in the packet header identifying the customer (or other criteria) and makes selections to drop or pass packets destined for the shared queue based on the customer identification. For example, customer A may have contracted with the service provider for a bandwidth allocation larger than the allocation for customer B. The algorithms described herein allow customer A to use more of the queue space than customer B before congestion controlling (e.g., dropping) customer A's packets. In such a case, the packet flows are aggregated, and thus managed, on a per customer basis, and the particular algorithm used for dropping packets in an aggregate flow is dependent on the particular customer.

In one embodiment, a customer ID (e.g., a source ID) is located in a field in the header of a packet. Customers can be identified by several fields including customer labels, MPLS labels, VLAN labels (Virtual Local Area Network labels), node labels, or proprietary customer labels. These fields may reside anywhere in the layer 2 header, layer 2.5 header, or layer 3 header.

The aggregate fair queuing algorithm limits each customer to a maximum space allocation in a class queue. This not only enforces the Service Level Agreement (SLA) but ensures that all customers get fair use of the queue in case of bursting.

In the preferred embodiment, the aggregate fair queuing algorithm does not drop packets unless there is some level of congestion, such as a detection that the queue has reached a certain capacity. A queue packet counter may be used to detect the fullness of the queue and signal when the queue reached a certain threshold. Congestion triggers settings that are dependent on negotiated bandwidth. This results in link utilization that is maximized at all times. When a congestion situation does not exist, customer traffic is not affected by the techniques described herein.

The above-described fair queuing algorithms may be implemented as follows. Other techniques are possible. To fairly drop packets in a shared class queue situation, each customer's virtual buffer occupancy is computed. If this virtual buffer is congested for a particular customer, the incoming packets are algorithmically dropped prior to the packets being stored in the shared queue.

To compute instantaneous buffer occupancy, the packets from each customer (based on a code in the packet header) are counted by a separate packet counter for each customer before the packets are stored in the shared queue for a particular class. At any given time, sampling the buffer occupancies per customer gives instantaneous buffer occupancy. Average buffer occupancy is computed from this as follows. Average buffer occupancy=[$\alpha$×instantaneous buffer occupancy)]+[(1−$\alpha$)×(previous average buffer occupancy)], where $\alpha$ (e.g., 0.2) is configurable. The average buffer occupancy is then used to look up in a preconfigured threshold table an appropriate drop count for the subject aggregate. The drop count value is then used to program hardware to drop packets in accordance with the drop count value. If the drop count value from the table is, for example, 5, then the hardware drops every fifth packet until a different drop count value is selected based on the average buffer occupancy. The drop counts in the threshold table are based on the customer's SLA (assuming the aggregation is per customer). Other algorithms for selectively dropping packets may be used.

Thus, packets are dropped in a fair way based on the customers' agreements with the service provider in case of congestion.

In a communications network where downstream nodes pass traffic from upstream nodes, nodes closer to a particular central office, through which traffic from the nodes must be routed, inherently have more access to that office's router and, in the prior art, are given more bandwidth than upstream nodes. In one embodiment of the present invention, the relative positions of the nodes are taken into account by each node when dropping packets by detecting a node address (or other ID code) so that packets from the various nodes are dropped in a more fair way when there is congestion in the network, irrespective of the "passing" node's position relative to the other nodes. In such a case, the aggregate of flows is on a per node basis. The nodes may be identified by a node address in the packet header.

The implementation for an aggregate fair queuing technique between nodes is similar to that described above for the customers' aggregate flows, but the relative location of a node determines the various nodes' drop counts stored in the threshold look-up table.

In one embodiment, the algorithm for dropping packets is a derivative of the well known random early detection (RED) algorithm, which drops packets prior to a queue overflowing by increasing the probability that a packet will be dropped as the queue become more and more full. The prior art RED algorithm is unable to let customers in a congested network share bandwidth fairly. The present inventive technique applied to RED increases the probability of dropping a packet when the average buffer occupancy for a customer or node increases.

BRIEF DESCRIPTION OF THE DRAWINGS

Elements labeled with the same numerals in multiple figures are similar or identical.

DETAILED DESCRIPTION OF THE EMBODIMENTS

Figure 1:
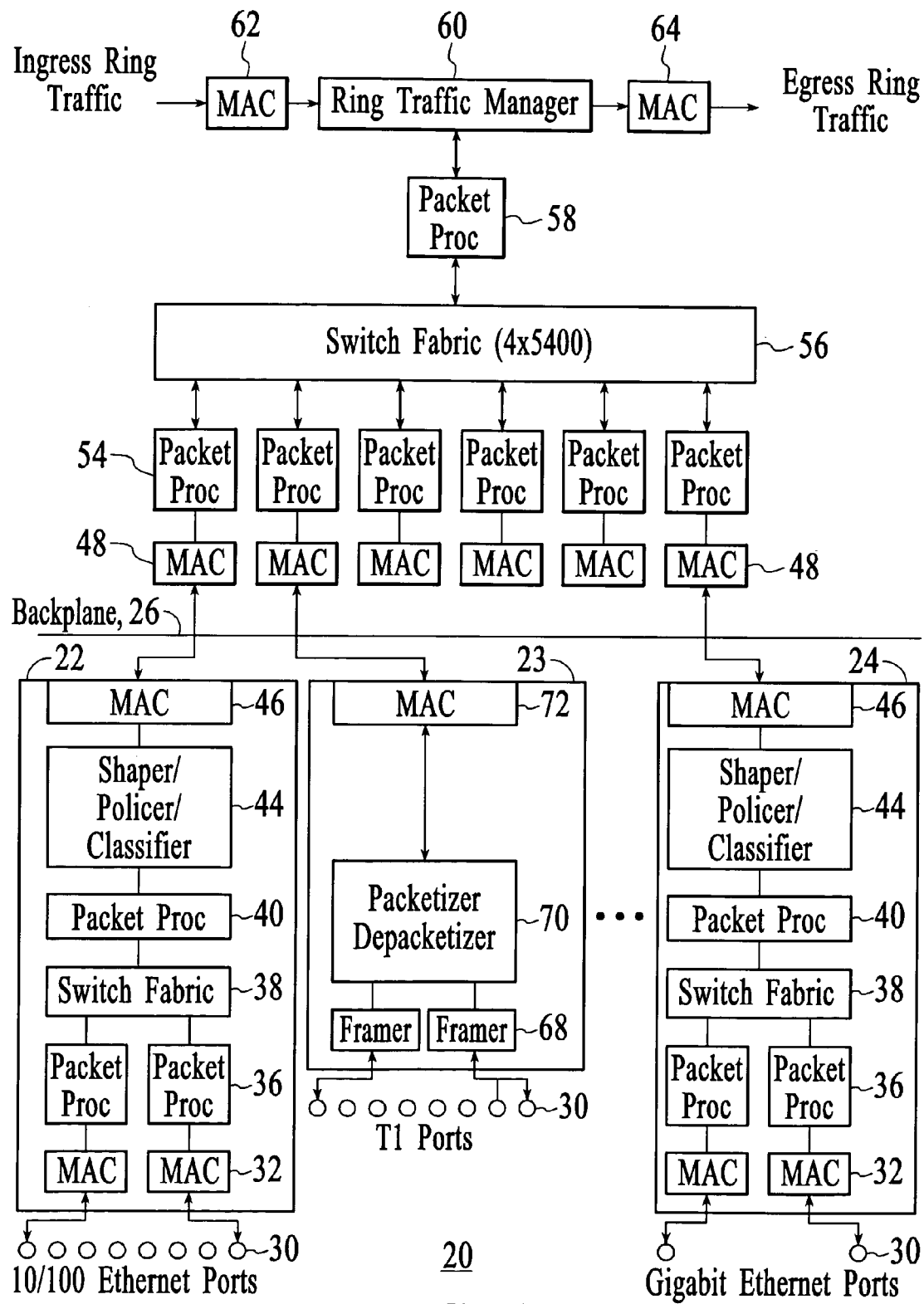
FIG. 1 represents one type of router in a ring or mesh type network that incorporates the present invention, although the present invention may be incorporated in any type of router.

Although the present application generally relates to input queuing in a communications system, placing the invention in the context of an actual communications network would be helpful for a more complete understanding of how the invention may be used. FIG. 1 illustrates basic functional blocks in one type of router or node 20 in a communications network. Numerous other router systems may also be used in accordance with the present invention.

In FIG. 1, various line cards 22, 23, and 24 (also called interface cards) are connected to a backplane 26 of a router in node 20. Only one of the line cards need be described in detail to place the invention in context. Each line card has a number of ports 30 connected to various sources of data. Typically, each port is associated with a customer.

The ports are connected to media access controllers (MAC) 32 that perform well known functions such as managing communications, assembling the data into packets (or other formats), and generating error codes for an error field. The MACs 32 may be field programmable gate arrays.

The MACs 32 output the packets to packet processors 36. Packet processors 36 detect a header field of a packet structured by the MACs 32. The packet processors 36 interface with an external search machine/memory (a look-up table) that contains routing information to route the data to its intended destination. The packet processors 36 may add to the packet header, perform parsing, or perform various other well known operations.

The processors 36 then provide the packets to a port of a switch fabric 38, which forwards the packets to another packet processor 40. Since the packetizers 36 and 40 are bi-directional, the packetizers 36 and 40 typically have one set of functions when data is flowing to the ports 30 from the network and different functions when data is flowing from the ports to the network. The functions of packet processors are well known, and examples of suitable packet processors include the XPIF gigabit bitstream processor or the EPIF4-L3CI ethernet port L3 processor by MMC Networks, whose data sheets are incorporated herein by reference.

The packets from packet processor 40 are applied to a shaper/policer/classifier 44, which contains one embodiment of the class queuing technique invention. The classifier portion detects a field in the packet that identifies the class of the packet. This class may have been appended to the header of the packet by the source of the data, the MAC 32, the packet processor 36, or other means. The classifier sends the packet to a shaper/policer associated with that particular class. Since, in one embodiment, there are eight classes, there are eight policers per input part in the line card.

Each shaper/policer ensures that the bandwidth of the traffic output from the policer is no greater than a committed access rate and a maximum burst size. This criteria is typical established by the Service Level Agreements (SLAs) between the customer and the service provider. If the policer detects a greater bandwidth than is allocated, it may delay the traffic, drop the traffic, or mark down the traffic to demote its class. Packets that are forwarded from the shaper/policer are then applied to shared queues, which is the primary subject of this application and will be described in detail later.

The packets output from the shaper/policer/classifier 44 are applied to a MAC 46 that acts as an interface between the backplane 26 of the router and the line card 22.

Another MAC 48 provides the interface to a switching card that includes packet processors 54 and a switch fabric 56. The packet processors 54 allow forwarding and processing decisions to be made based upon the various fields in a packet. All packet processors in FIG. 1 are bidirectional and thus perform different functions depending upon the direction of the data.

The switch fabric 56 routes the various incoming packets at certain ports to other ports of the switch fabric based on packet header information, as is well known.

Another packet processor 58 further processes the packets, and a ring traffic manager 60 controls the scheduling of packets to be placed on the network. The packets to be scheduled are those output from the packet processor 58 and those just passing through the node from the network.

The ingress ring traffic is applied to a MAC 62, and packets to be placed on the ring are processed by MAC 64. Since a ring may be bi-directional, there may be another port of switch fabric 56 for placing data on the opposite-direction ring and receiving data from the opposite-direction ring. A MPLS label in the packet header is sometimes used to determine the direction of a packet on the ring.

Each of the line cards 22, 23, and 24 contains circuitry and software that depend upon the equipment connected to the various ports of the line cards. The line card 23 includes framers 68, a packetizer/depacketizer 70, and a MAC 72.

The line card 24 contains functional blocks similar to those in the line card 22, although they are programmed in accordance with the requirements for that line card.

Since one embodiment of the invention is primarily located in the shaper/policer/classifier 44 block, virtually any router design may incorporate the present invention.

Each input port 30 may receive packets from multiple customers, where the customers are identified with a customer ID in the packet header.

Figure 2:
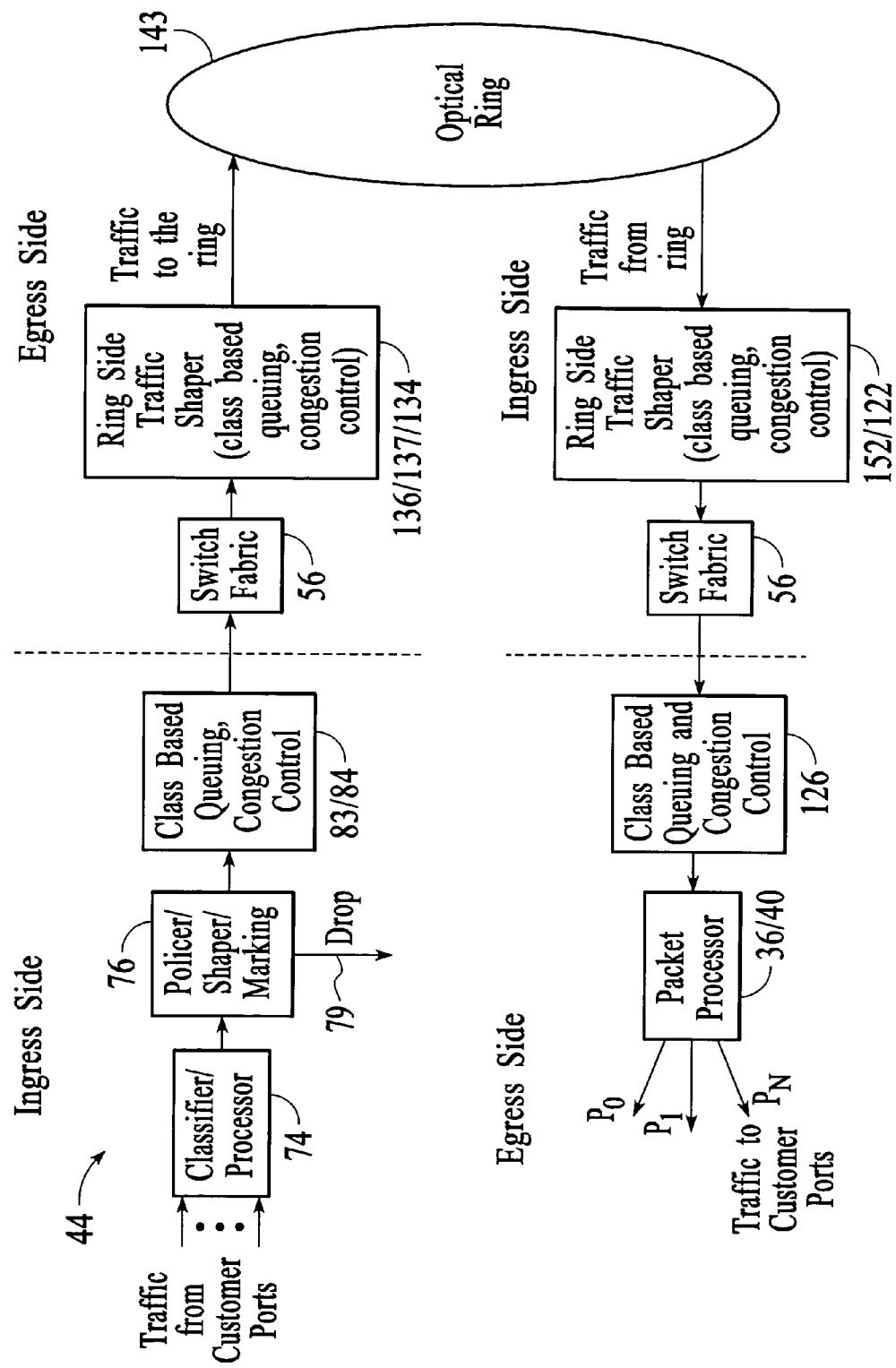
FIG. 2 illustrates further detail of the shaper/policer/classifier block in the line cards and ring card of FIG. 1.

In FIG. 2, further detail is shown of the shaper/policer/classifier 44. A classifier 74 is well known and may use a processor or hardware (e.g., an FPGA) to detect certain bits in a packet header that identify in which of eight classes the packet belongs. The classifier 74 identifies the aggregate (customer, node, etc.) by the bits in the header and may add the customer ID to the packet header. The classifier 74 may add or modify a class (or priority) field in the packet header based on the source or destination IP address, the input port, or the protocol type. A look-up table identifies the particular class associated with the packet header bits used for the classification.

A packet processor (shown as part of classifier 74 in FIG. 2) then routes the packet for a particular class to the policer/shaper 76 for that class.

Figure 3:
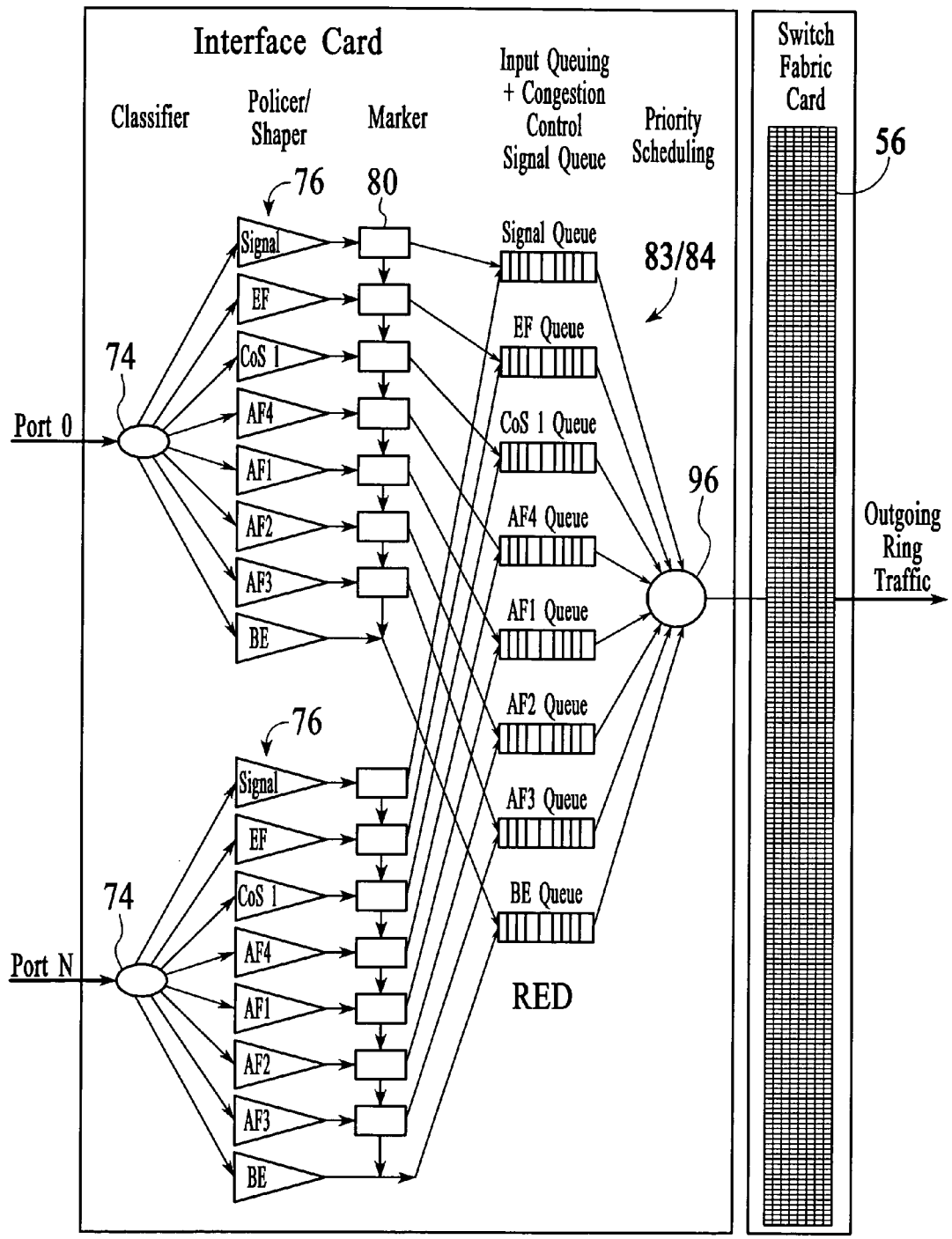
FIG. 3 shows greater detail of the classifier, policer/shaper, and shared queues in the line cards.

FIG. 3 shows portions of FIG. 2 in greater detail, illustrating a separate policer/shaper 76 for each of the eight classes of packets. The eight classes are as follows:

Signaling: High priority signaling, such as clocking, to manage the network.

Express Forwarding (EF): Provisioned delay sensitive service. Targeted to implement Virtual Leased Line services with bandwidth and delay guarantees. Voice services are the target application for Express Forwarding class.

Assured Forwarding (AF4): Provisioned delay insensitive data service. Targeted for Internet data applications that need bandwidth guarantees but can tolerate delay. This class will be utilized to carry all the IP data from customers that have an SLA with providers. This can be utilized to support delay insensitive provisioned class and over-committed delay insensitive provisioned class.

Assured Forwarding (AF1): Over-committed provisioned delay insensitive data service. This class is targeted for services that are over-committed by a controlled factor. For example, 400 Meg is available but 800 Meg is promised to customers (200% over-committed).

Class of Service (CoS1): Customized classes.

Best Effort (BE): Best Effort Service. This service class utilizes output link bandwidth that is left over from other class traffic. Whenever congestion occurs, this is the first class where packets are dropped. This class is targeted for low paying customers that do not need any bandwidth and delay commitments from the service provider.

Policers/shapers are used to protect the network resources and ensure conformance of the SLA for each class. A policer that has a buffer in front to temporarily delay non-conforming packets is called a shaper. The policer/shaper enforces the legal rate of the data and the burst size. If the date rate and burst size are within specifications, the policer/shaper passes the incoming packet unaltered. If the packet is out of profile, then the following options will be available:

Drop the out-of-profile traffic;

Mark-down the out-of-profile traffic to demote the traffic class, which can result in queuing the out-of-profile traffic in a different traffic class or in the same traffic class with higher drop-precedence.

The Service Level Agreement (SLA) between the provider and the customer should specify the following parameters for each policer/shaper:

Committed access rate;
Maximum burst size;
The in-profile class code point;
The out-of-profile action (drop or mark-down) plus the out-of-profile class code point.

In one embodiment, a token bucket algorithm is used for the policer. The bandwidth provisioned for each class is controlled by these token bucket policers with a configurable committed rate and a maximum burst size. By decoupling the policing/shaping from packet scheduling, the provisioning of bandwidth in each class throughout the network is precisely controlled, allowing resource management to be made much easier.

In FIG. 2, the packets output from the policer/shaper 76 may be forwarded, dropped 79, or marked by a marker 80 (FIG. 3). The marker 80 is for changing bits in the packet header or performing other alterations of the packet header based on the action of the policer/shaper 76. For example, if the policer/shaper 76 lowers the class of the packet due to the data rate or the burst size being too high, the marker then reassigns the class of that packet. The packet is then forwarded.

Once the traffic stream is classified, marked, and policed, the traffic is forwarded to a queue 84 associated with each class. In one embodiment, since there are eight classes, there are eight separate queues.

Queuing circuit 83, shown in FIG. 2, provides congestion control as well as queuing. Queuing circuit 83 uses the class code in the header to determine the particular class queue 84 for the incoming packet and forwards the packet to one of eight queues 84, shown in FIG. 3. The queuing circuit 83 performs an aggregate fair packet dropping function, described later with respect to FIGS. 4 and 5.

Although FIG. 3 shows physical ports O–N, where each port may be associated with a particular customer, this is functionally equivalent to one data stream containing an aggregate of various customers' packets from different ports. Of course, the speed of the processing of the data must increase as the number of flows from various ports are combined. Further, each port may carry an aggregate stream of data. The present invention is equally applicable to physically separate flows vying for the same shared class queue or combined flows from different customers destined for the same queue, because the present invention uses information in the packet headers to identify the aggregate (e.g., the customer) and determine if packets should be dropped.

As previously described, certain shared queues 84, each receiving a class of packets from multiple aggregates, may become congested. This is particularly the case with the over-committed lower classes of queues. Once a shared queue has become congested, in the prior art, packets are dropped using various types of congestion control algorithms (e.g., RED), irrespective of the customers' SLAs, to keep the queue from overflowing. However, it is unfair to treat each of the customers equally when dropping such packets from the class queues, since certain customers may have contracted with the service provider for greater bandwidth, and such customers' packets should get preferential treatment in the congestion control algorithms. One embodiment of the present invention takes into consideration a particular customer when determining which packets to drop.

Figure 4:
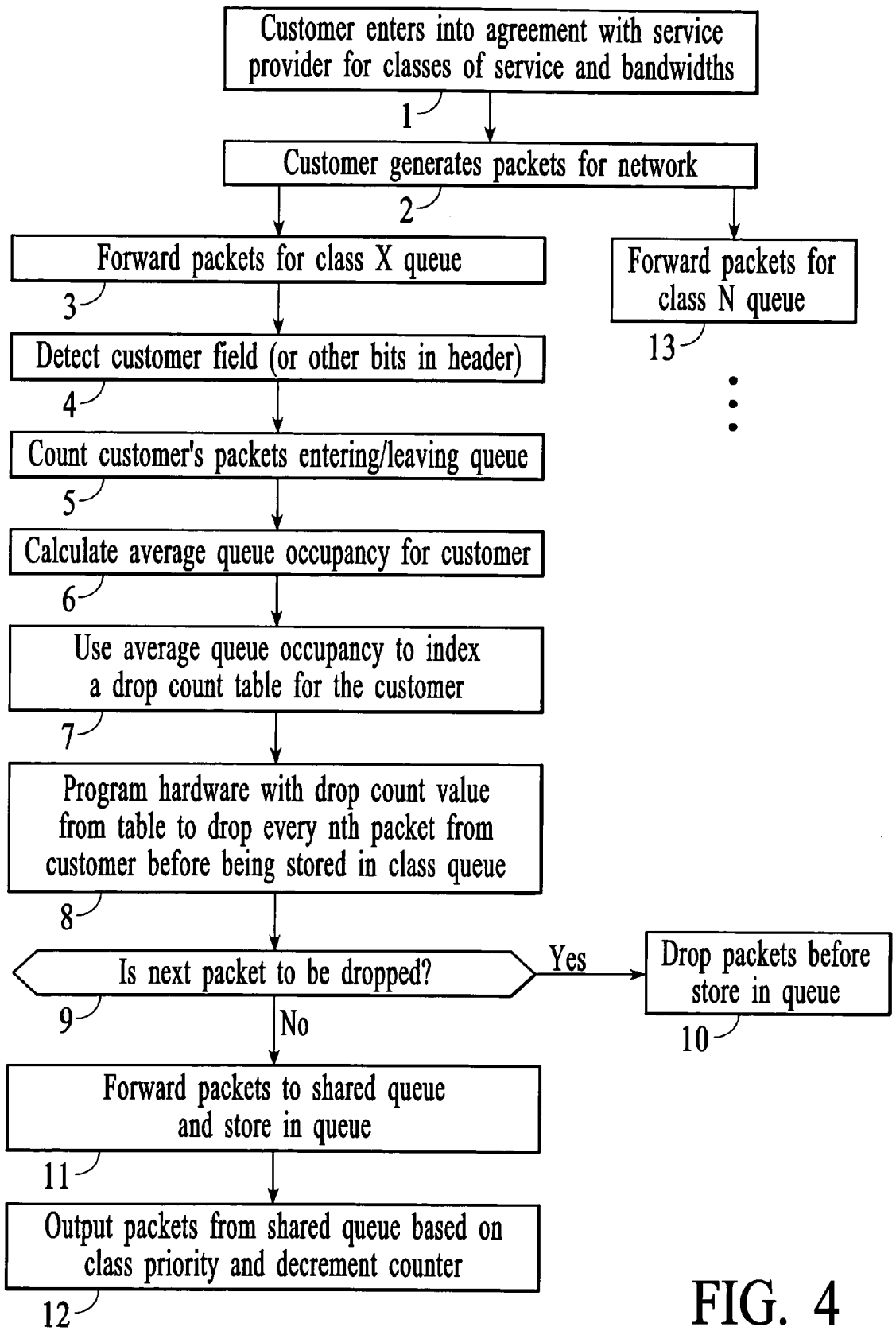
FIG. 4 is a flow chart illustrating the various steps performed by the fair queuing technique when dropping ingress packets based on a customer ID. A similar technique may be applied to dropping packets based on a node ID or other label.

FIG. 4 is a flow chart illustrating the steps used by certain class queues 84 for dropping packets prior to the packets being stored in the class queue.

Figure 5:
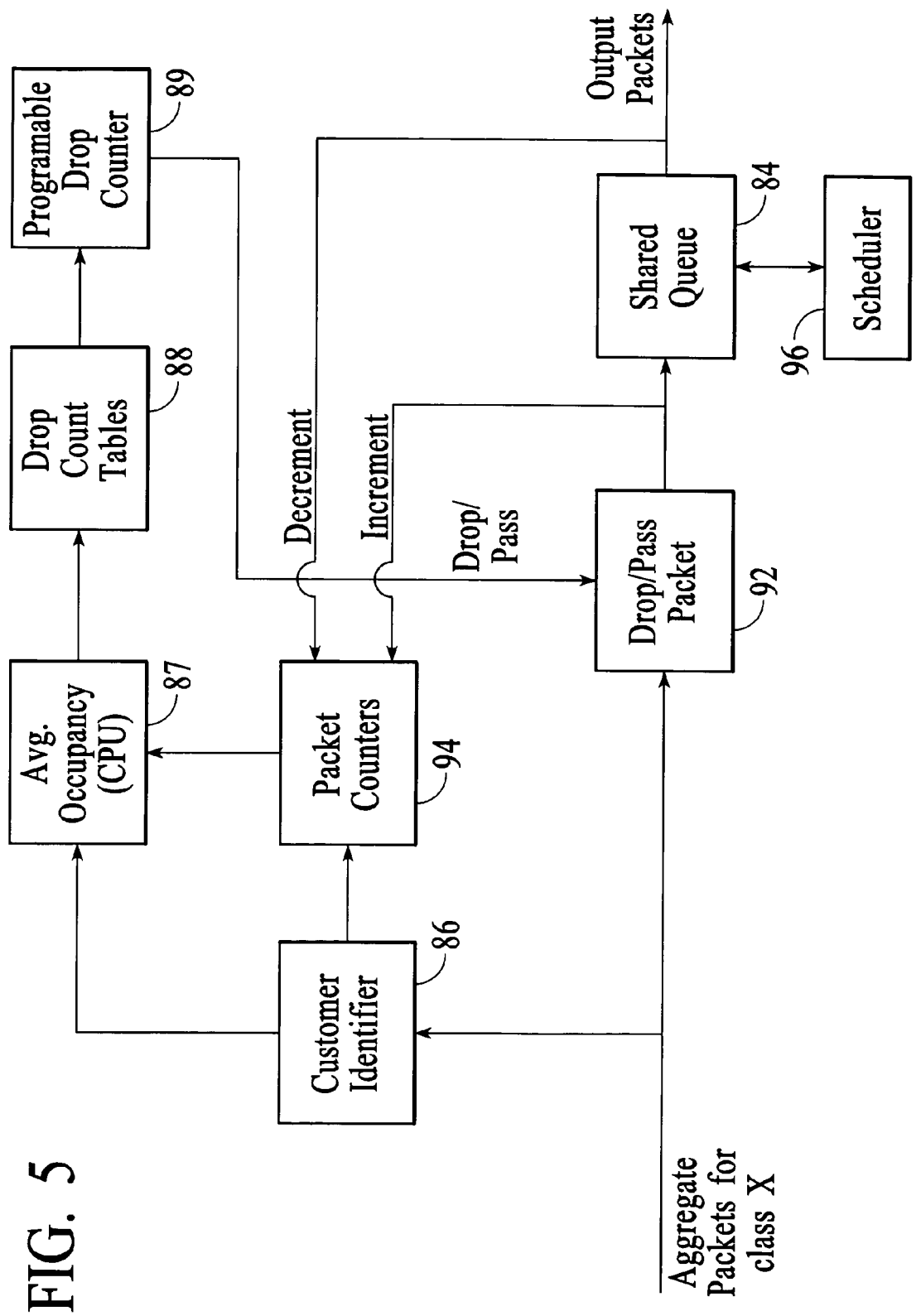
FIG. 5 illustrates one of the many types of embodiments of functional units that may be used to count each customer's packets stored in the shared queue so that certain customer's packets will have a higher likelihood of being dropped than packets from other customers. Similar functional units apply for fair dropping of packets based on a node label.

FIG. 5 is a diagram illustrating the various functional units used to carry out the steps in FIG. 4. These functions may be carried out in hardware, software, and/or firmware, as would be understood by those skilled in the art. In FIG. 4, it is assumed the packet flows are aggregated on a per customer basis (i.e., congestion control will be on a per customer basis).

In step 1 of FIG. 4, the various customers using the network enter into Service Level Agreements (SLAs) with the service provider for various classes of service and bandwidths for the customers' data traffic. For example, if the customer requires a large bandwidth for voice data, the customer contracts with the service provider for the anticipated bandwidth in the class of service associated with voice traffic. Other customers with lower priority data may contract for an over-committed class of service.

In step 2 of FIG. 4, the various customers generate packets (or data in other formats) for the network. These packets are classified and are forwarded for being stored in a class queue (step 3). It will be assumed that such a class allows for the dropping of packets when there is congestion. FIG. 4 shows a process flow for only one class of service; however, the same process flow may apply to any other class in which packets may be dropped.

In step 4, the packet header is analyzed to determine the identity of the customer. Such an identity may be based on the explicit customer ID field in the header. Other fields that may be used to determine an aggregate include the source field, destination field, MPLS label, port ID field, or another field or combination of fields. The hardware for detecting these bits in a packet header is shown as the customer identifier 86 in FIG. 5. Well known packet processors/classifiers can be easily programmed to carry out the process described with respect to FIGS. 4 and 5.

In step 5, the customer's packets entering and leaving the queue 84 are counted by counter 94 in FIG. 5 to identify the instantaneous queue occupancy by that customer. Other customer's packets are similarly counted. Since the system allows for bursting, only the average queue occupancy is used to determine the dropping of packets from a customer. The average queue occupancy is calculated (step 6) as follows. Average buffer occupancy=[α×instantaneous buffer occupancy)]+[(1−α)×(previous average buffer occupancy)], where a (e.g., 0.2) is configurable. A CPU 87 (FIG. 5) may be used to calculate the average occupancy.

In step 7, the average queue occupancy is then used as an index for a drop count look-up table 88 for that customer. The indexed drop count value (e.g. 5) from the table is then used to program hardware, such as a packet drop counter 89, so as to drop, for example, every fifth packet from that customer destined for the shared queue (step 8). The drop count values in the table are based on the SLA with the customer. For a particular class queue, a customer contracting with the service provider for a bandwidth greater than that for another customer would have lower drop count values in the drop count table.

Other algorithms for dropping packets may be used; however, progressively dropping more and more packets as the customer's average queue occupancy increases in a congestion situation is believed to be the most desirable. This is referred to herein as aggregate RED (ARED).

In step 9, the decision is made to either forward the packet to the shared queue 84 or drop the packet (step 10) based upon the output of the drop counter 89. The functional block for forwarding or dropping the packet is shown in FIG. 5 as the drop/pass packet block 92. If the packet is passed to the shared queue 84, a packet counter 94 for that particular customer is incremented, and the packet is stored in the shared queue 84 (step 11). The circuitry of FIG. 5 may be implemented by a high speed ASIC, gate array, or programmable processor.

When a scheduler 96 determines that the shared queue 84 for that particular class is to output packets to the backplane 26 (FIG. 1), the packets output from queue 84 for a particular customer then decrement the customer's packet counter 94 (step 12). A similar process may be performed for other shared queues, as depicted in step 13.

The steps 6–8 may be performed 10–100 times per second for a Gigabits per second network, and step 9 is performed at the packet transmit rate.

In one embodiment, packets are only dropped when there is a congestion problem (e.g., the shared queue 84 has reached a certain capacity threshold). A packet counter for determining whether queue 84 has reached a certain capacity so as to be classified as a congestion situation may provide a signal to any of the various functional blocks 87, 88, 89, or 92 to cause no packets to be dropped if there is no queue 84 congestion.

Dropping of a packet usually results in a reduced transmission bandwidth. For TCP sources, they usually exponentially back off on their transmission rate for every packet dropped and, for no packets dropped, they linearly increase their transmission bandwidth.

As seen in the above embodiment, the circuitry of FIG. 5 performs an algorithm that drops packets on a probabilistic basis prior to the shared queue 84 becoming completely filled. This prevents oscillations and results in higher throughput and fewer lost packets in the network. Other techniques may set a threshold occupancy for each customer and drop customer's packets if the customer's threshold occupancy is exceeded. The dropping of packets using any drop function in accordance with the above embodiments is related to the particular customer associated with the packet (assuming aggregation on a per customer basis) and the customer's allocated bandwidth for the network. One type of congestion control algorithm that may be modified by the present invention is commonly called randomly early detection (RED), where more and more packets are dropped as the shared queue 84 becomes filled up. In adapting RED to the present invention, a particular customer's packets are dropped more frequently (determined by the drop count tables) as the customer's average occupancy increases.

Referring back to FIG. 1, the output of the shaper/policer/classifier 44 is then further processed by the various functional blocks and switched by switch fabric 56 (also shown in FIGS. 2 and 3). FIGS. 2 and 3 are simplified and do not show various components of FIG. 1.

Figure 6:
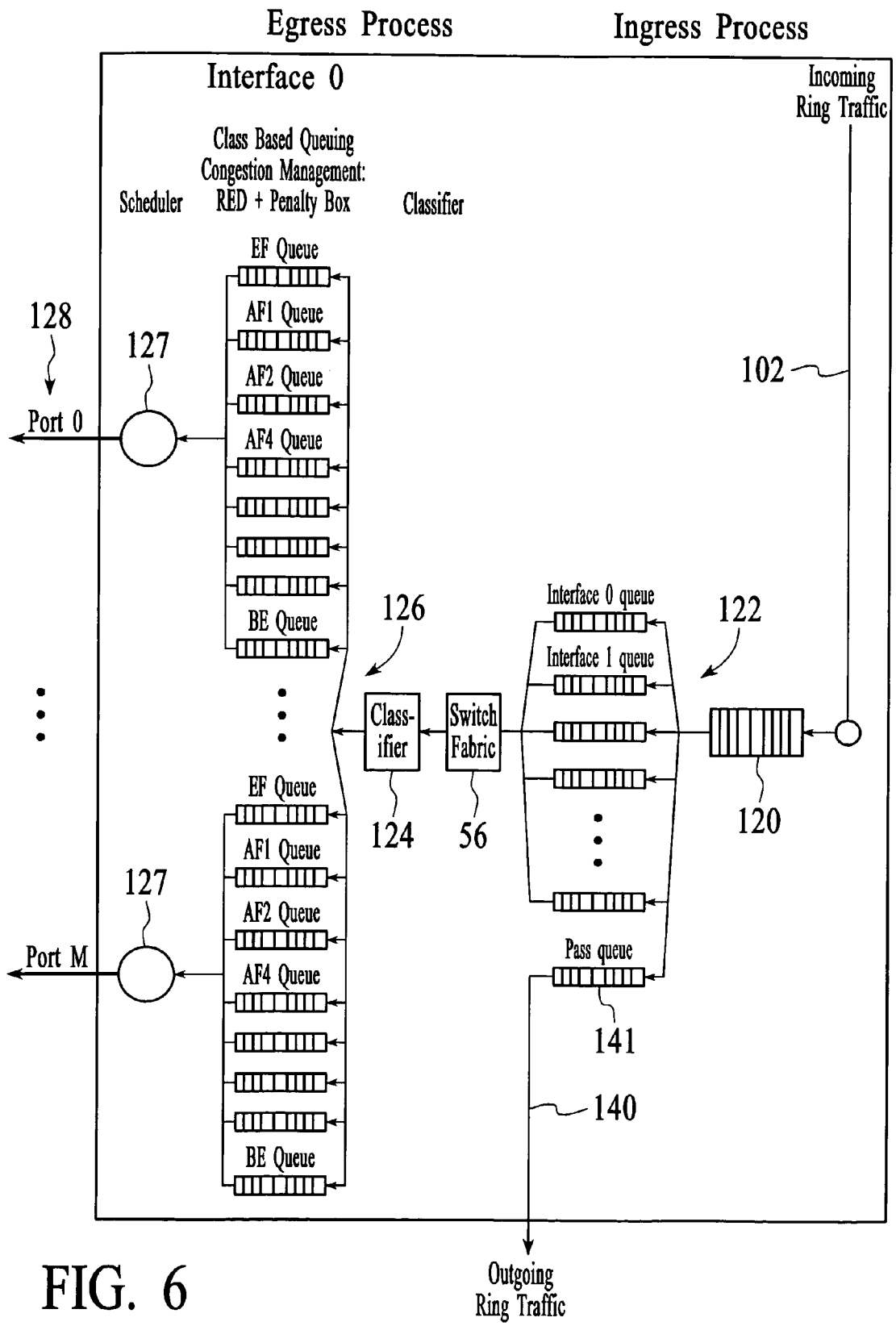
FIG. 6 illustrates the invention being applied in the egress process as packets are being routed from the network to the various output ports of the router.

The invention may also be applied to the egress portion of the line cards where the packets from the network (node drop-traffic) are destined for certain output ports of the node. FIG. 6 illustrates traffic from the ring destined for the node. After the incoming ring traffic 102 is queued by queues 120 and 122 in the ring card or switching card, the switch fabric 56 switches the incoming packets to the appropriate line card (or interface card). The traffic is then classified by classifier 124 by detecting the class of service bits in the packet header. The class based queuing algorithm is performed by queues 126 as described in FIGS. 4 and 5, where the customer ID code is identified from the packets, and the various drop count tables are indexed for the various queues 126. FIG. 2 also shows queues 126. Schedulers 127 control the flow of traffic from the queues 126 to the various ports. The network traffic may also pass through the node as outgoing ring traffic 140 via pass queue 141.

If the switching fabric 38 (FIG. 1) in the line card is located between the class queues 126 and the output ports (as shown in FIG. 1), the traffic may be aggregated during queuing, enabling the use of only a single set of eight queues for all output ports. The switch fabric would then route the packets from the output queues to the various ports 128 (FIG. 6).

Node Based Fairness Control

Figure 7:
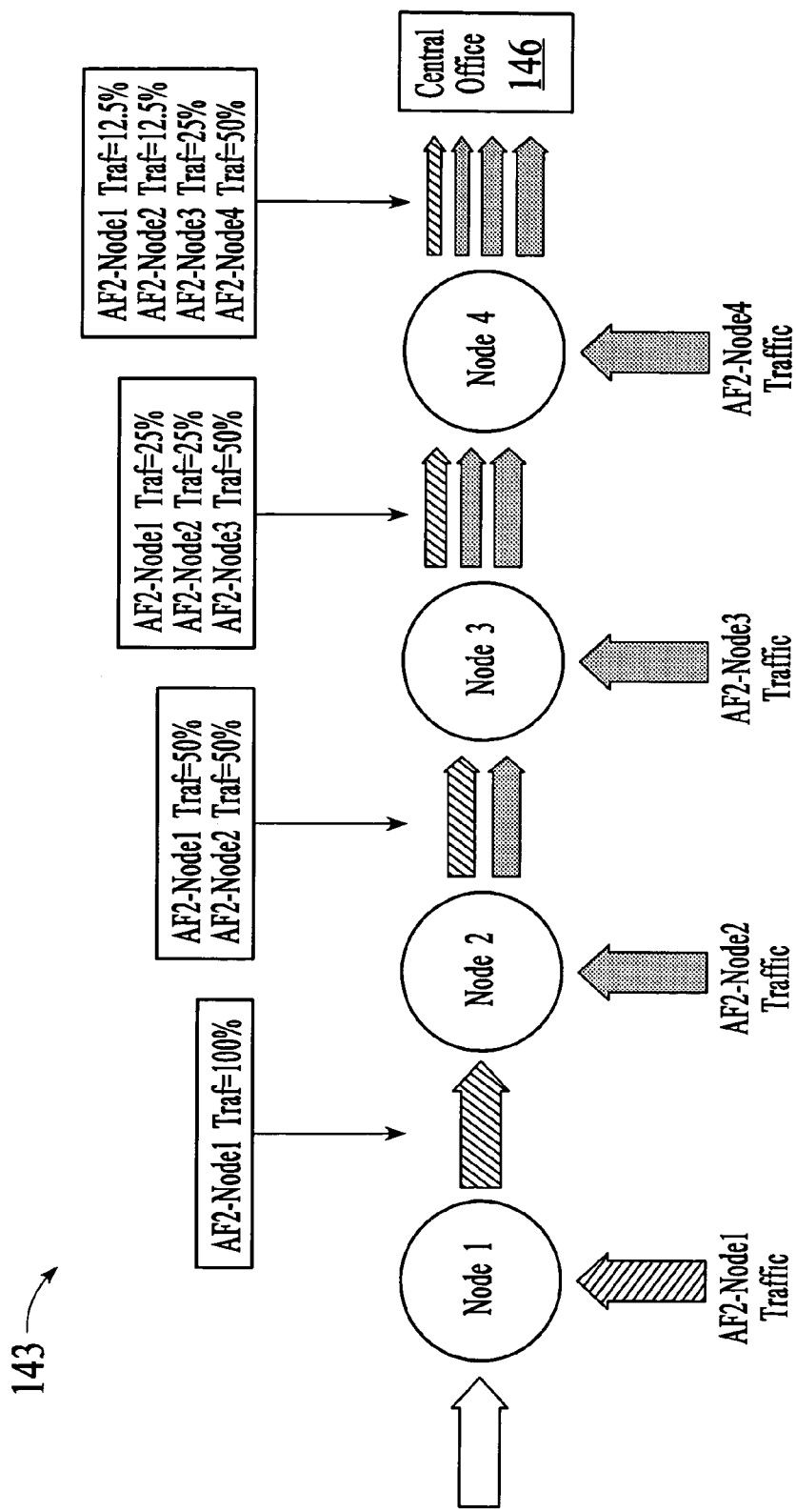
FIG. 7 illustrates a problem with the prior art networks where the certain nodes are inherently granted greater access to the network in an unfair manner.
Figure 8:
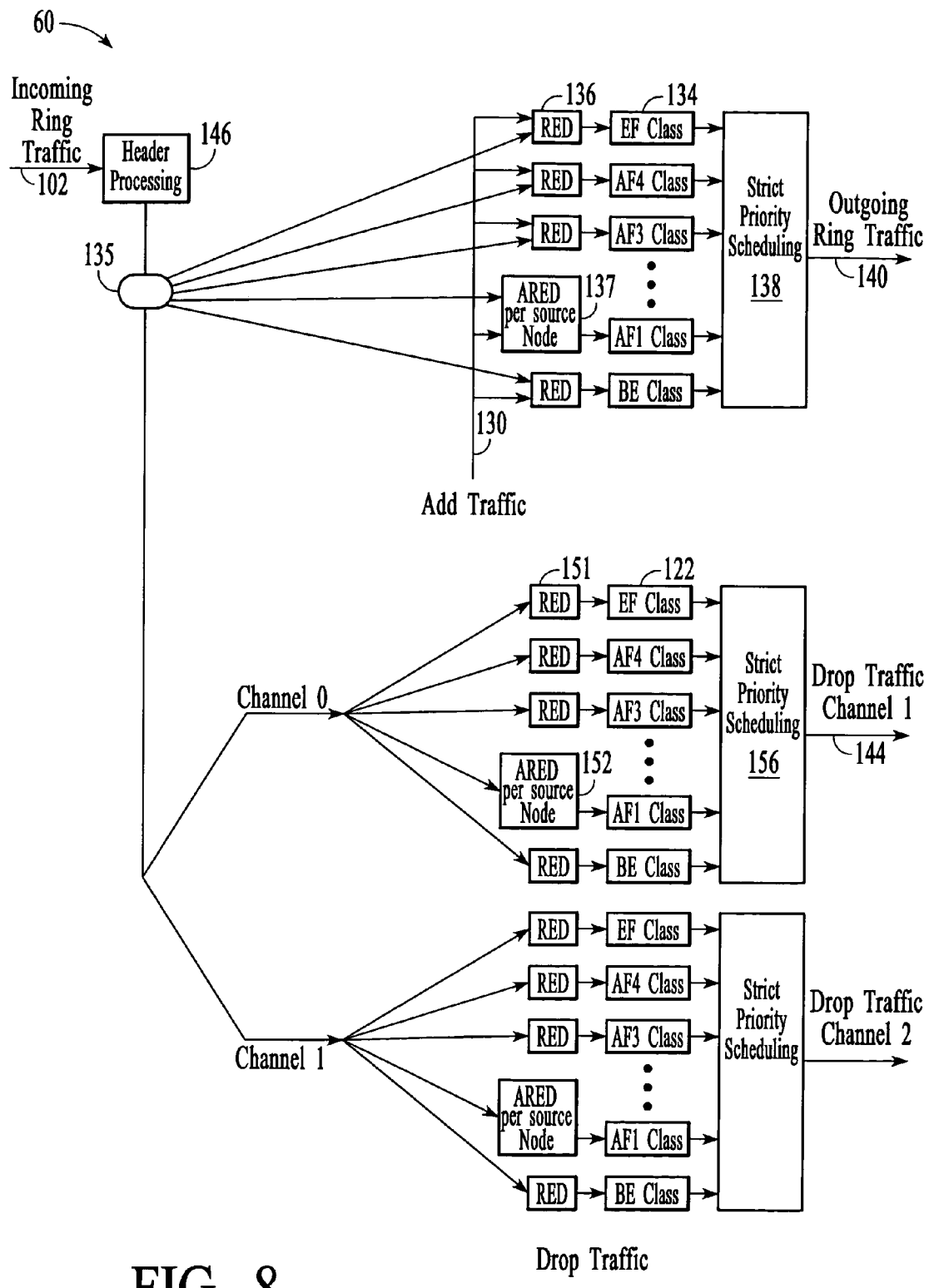
FIG. 8 illustrates portions of the ring card that perform fair queuing based on the originating node ID.
Figure 9:
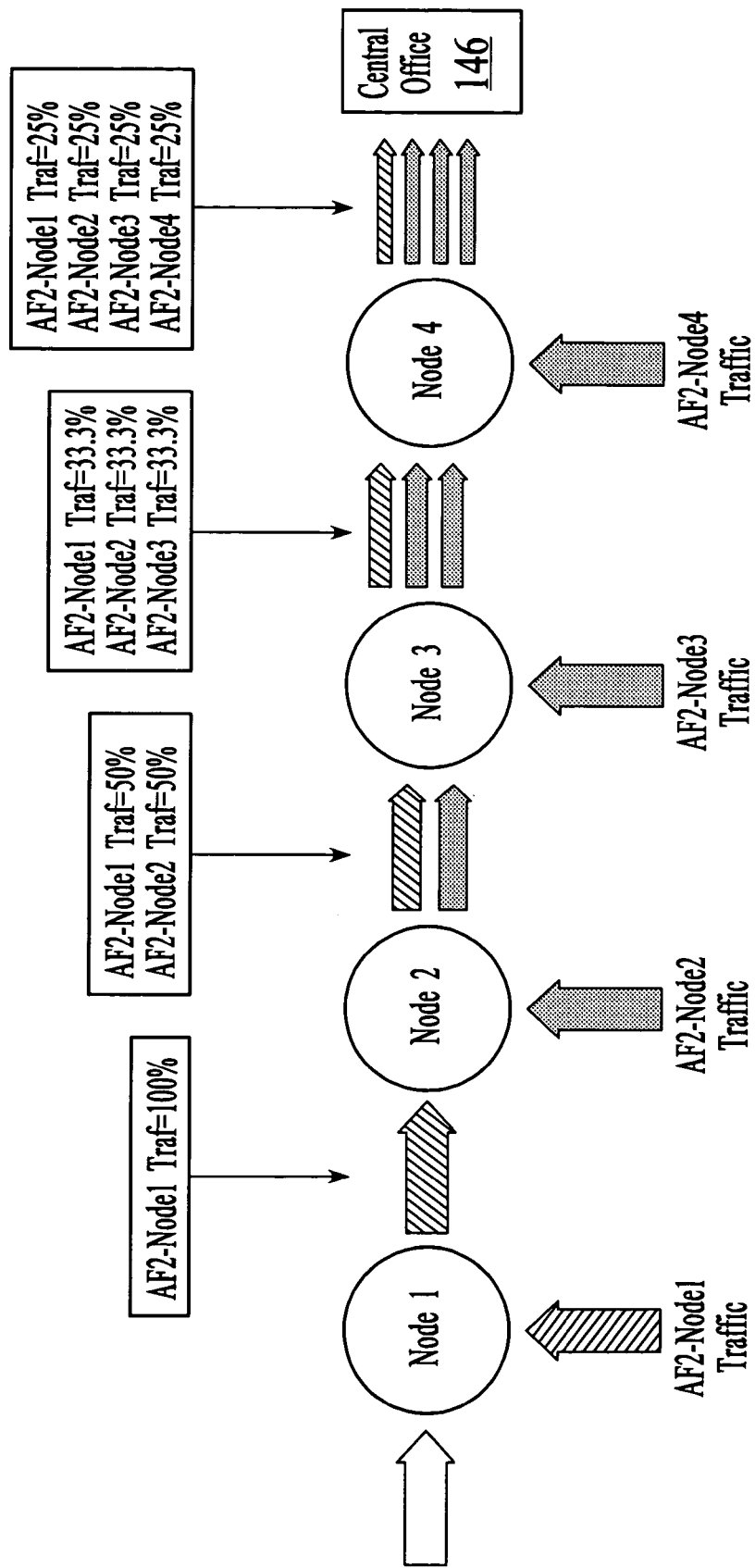
FIG. 9 illustrates the improvement to FIG. 7 by using the present invention.

FIGS. 7–9 illustrate the effectiveness of aggregate fair queuing applied to the pass traffic through a node when node labels in packet headers are used to determine which packets are to be dropped by the ring card. FIG. 7 illustrates the prior art situation where various nodes 1–4 are connected in a ring 143 leading through a central office 146 through which virtually all traffic flows. All traffic generated by node 1 is passed to node 2. Node 2 is the source of additional traffic and must now pass that additional traffic plus the traffic generated by node 1 through node 3. The ring traffic manager in node 2 shares the network bandwidth equally between nodes 1 and 2, resulting in 50% of the traffic forwarded to node 3 being generated by node 1 and 50% being generated by node 2. Node 3 then adds more traffic, and its scheduler schedules 50% of the network bandwidth for the node 3 traffic and divides the remaining bandwidth equally between nodes 1 and 2. Node 4 then adds additional traffic, and its scheduler allocates half the network bandwidth to node 4 while splitting the incoming traffic's bandwidth in half, resulting in the node 4 being unfairly allocated more bandwidth than upstream nodes 1, 2, and 3 even though the customers placing traffic on nodes 1–3 may have contracted with the service provider for the same bandwidth allocated for node 4.

Using the configuration in FIG. 8, where the pass traffic from other nodes as well as the node add-traffic is applied to a fair queuing algorithm, the percentage of the traffic forwarded by any node can be adjusted based on the node identification in the packet headers rather than the customer identification. The node generating the traffic on a network is identified in the packet header by any one of various fields. For example, the source address is associated with a particular node. There may also be a dedicated field in the packet header for the node identifier. This node label is used by functional units similar to those shown in FIG. 5 to control the dropping of a node's packets when there is congestion, in accordance with the fairness algorithm. Other techniques may also be used to drop packets based on the source node.

Node-fairness queuing control is performed in the ring traffic manager 60 (FIG. 1). The ring traffic manager 60 schedules the insertion of packets from the local router onto the network while also allowing packets already on the network to pass through the ring card and back onto the network.

In FIG. 8, traffic generated by customers connected to the input ports of the router is designated as "add-traffic 130" and constitutes all the packets intended to be placed on the network by the node. A classifier (not shown) detects the class of service, and, if there is no congestion, the packets associated with each of the various classes are forwarded to the appropriate class queues 134 in the ring card. Packets from the ring (node pass traffic) that are to pass through the node are also classified (by classifier 135) and forwarded to the appropriate class queues 134.

Once particular class queues 134 have filled to a certain capacity, random early detection (RED) routines performed by RED processors 136 will drop packets based upon the available space in each of the queues 134. For certain over-committed classes, in accordance with the invention, the dropping of packets will also be based upon the originating (source) node for the traffic. In FIG. 8, this over-committed class implementing the invention is the assured forwarding class (AF1), and the invention is implemented in the functional block ARED 137.

The detection of the node identification (rather than customer ID), the counting of the packets entering and leaving a particular class queue for a node, and application of the particular ARED 137 algorithm for dropping the node's packets are similar to that discussed with respect to FIGS. 2–5. The packet dropping algorithm provides fairness according to negotiated SLAs on a per aggregate basis (node ID's in this case). For example, all nodes may be assigned algorithms that give all nodes equal bandwidth, assuming all nodes have negotiated such bandwidths with the service provider.

Certain classes, such as voice, are designed to never be congested, and the congestion algorithm described herein would typically not apply to those classes. Further, certain classes may be of such a low priority, such as a best effort class, that no node is given preference when dropping packets.

A conventional scheduler 138 schedules packets from the various classes to be placed on the outgoing ring as ring traffic 140. The nodes' packet counters associated with the congested AF1 class queue are then decremented, as previously described.

If a packet on the ring is destined for the node in FIG. 8 (referred to as node drop-traffic 144), that packet is dropped from the ring and further processed by the node to output the data at a corresponding output port of a line card. This portion of the node processing is shown in FIG. 8 as the incoming ring traffic 102 being applied to the header processor 146, which detects the destination address and controls a classifier 135 to pass the traffic or route the traffic to a port in the node. The classifier 145 then applies the various packets to the associated class queues 122 via conventional processors 151. The fair queuing (e.g., ARED) algorithms are performed on the packets by the ARED processors 152 to control congestion in a manner similar to that previously described.

A conventional scheduler 156 schedules the packets for being further processed by the node.

By implementing the inventive node-based fairness control technique shown in FIG. 8, the ARED algorithm performed by node 4 in FIG. 9 adjusts the drop counter thresholds for the various nodes to, in effect, favor nodes 1–3, as compared to the process performed in FIG. 7. With the drop count thresholds adjusted for each of the nodes, the bandwidth may be shared equally for every node irrespective of the location of the node. Of course, if one node were to be assigned greater access to the network, that node's drop count threshold may be programmed accordingly to give preference to that node over any other node irrespective of the location of the node.

The present invention may be applied to achieve fairness for any aggregate flow based on any criteria and not just based upon the customer or node. Other examples of criteria include MPLS labels and VLAN labels.

The present invention may be carried out using processors running a software code or may be implemented using hardware, firmware, or a mixture of hardware and software.

Various commercially available packet processors may be programmed to carry out a portion or all of the functions described herein.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a class based queuing architecture in a communications network comprising:
   receiving packets of a first class generated by a plurality of sources for being stored in a shared queue for said first class;
   detecting bits in said packets;
   associating at least one first congestion algorithm with a first set of said bits in said packets, said first congestion algorithm corresponding to a bandwidth associated with said first set of bits;
   associating at least one second congestion algorithm with a second set of said bits, said second congestion algorithm corresponding to a bandwidth associated with said second set of bits;
   counting a number of packets stored in said queue having said first set of bits in said packets;
   counting a number of packets stored in said queue having said second set of bits in said packets;
   determining whether to drop packets having said first set of bits prior to entering said queue based upon at least said first congestion algorithm; and
   determining whether to drop packets having said second set of bits prior to entering said queue based upon at least said second congestion algorithm.

2. The method of claim 1 further comprising dropping packets having said first bits in accordance with said first congestion algorithm and dropping packets having said second set of bits in accordance with said second congestion algorithm.

3. The method of claim 1 further comprising calculating a first average occupancy of packets having said first set of bits stored in said queue, where a selection of said first congestion algorithm is at least partly dependent on said first average occupancy; and
   calculating a second average occupancy of packets having said second set of bits stored in said queue, wherein selection of an algorithm for said second congestion algorithm is at least partially dependent on said second average occupancy.

4. The method of claim 1 wherein said first set of bits and said second of bits identify a respective customer providing said packets.

5. The method of claim 1 wherein said first set of bits and said second set of bits identify a respective node that originated said packets.

6. The method of claim 1 wherein said first set of bits and said second set of bits comprise multiple protocol label switching (MLPS) labels.

7. The method of claim 1 wherein said first set of bits and said second set of bits are virtual local area network (VLAN) labels.

8. The method of claim 1 wherein said first congestion algorithm and said second congestion algorithm are drop count algorithms that signify a respective percentage of packets having said first set of bits or second set of bits to be dropped prior to being stored in said queue.

9. The method of claim 8 wherein said drop count algorithms identify that every nth packet having said first set of bits or said second set of bits is to be dropped.

10. The method of claim 1 wherein said associating at least one first congestion algorithm and said associating at least one second congestion algorithm comprises:
   selecting said first congestion algorithm and said second congestion algorithm from one or more tables depending on an occupancy of packets having said first set of bits or packets having said second of bits in said queue.

11. The method of claim 1 wherein said first set of bits in said packets are not modified prior to being stored in said queue, and said second set of bits in said packets are not modified prior to being stored in said queue.

12. The method of claim 1 wherein said associating at least one first congestion algorithm and associating at least one second congestion algorithm comprises:
   determining a first average occupancy of packets having said first set of bits in said queue and a second average occupancy of packets having a second set of bits in said queue;
   applying said first average occupancy and said second average occupancy to at least one table, an output of said at least one table signifying said first congestion algorithm and said second congestion algorithm for dropping packets.

13. The method of claim 12 wherein said at least one table comprises a plurality of tables, a first table being associated with packets having first set of bits, and a second one of said tables being associated with packets having said second set of bits.

14. The method of claim 12 wherein said first average occupancy and said second average occupancy are determined by deriving a fraction of the instantaneous occupancy in said queue of packets having said first set of bits or said second set of bits and adding a fraction of a prior average occupancy of said packets having said first set of bits or said second set of bits in said queue.

15. The method of claim 12 wherein said output of said at least one table is used for dropping every nth packet having said first set of bits or second set of bits before being stored in said queue.

16. The method of claim 1 wherein said first congestion algorithm and said second congestion algorithm are random early detection (RED) algorithms performed on aggregate flows of packets.

17. The method of claim 1 wherein said method is performed in a line card in a node in said network.

18. The method of claim 1 wherein said method is performed in a ring card in a node in said network.

19. The method of claim 1 wherein said first set of bits and said second set of bits identify a source node, and said method allocates node bandwidth by application of said first congestion algorithm and second congestion algorithm based on a source node for said packets.

20. A node in a communications network comprising:
   a plurality of class queues, including a first class queue;
   a first packet counter counting the number of first packets in said first class queue, said first packets having a first set of bits in a header;
   a second packet counter counting the number of second packets in said first class queue, said second packets having a second set of bits in a header;
   look-up tables associated with said first packets and said second packets, said tables associating at least one first congestion algorithm with said first packets, said first congestion algorithm corresponding to a bandwidth associated with said first packets, and associating at least one second congestion algorithm with said second packets, said second congestion algorithm corresponding to a bandwidth associated with said second packets; and
   circuitry to drop said first packets prior to entering said first class queue based upon at least said first congestion algorithm and drop said second packets prior to entering said first class queue based upon at least said second congestion algorithm.

21. The node of claim 20 further comprising circuitry for calculating a first average occupancy of said first packets stored in said queue, where a selection of said first congestion algorithm is at least partly dependent on said first average occupancy, and for calculating a second average occupancy of said second packets stored in said queue, wherein selection of said second congestion algorithm is at least partially dependent on said second average occupancy.

22. The node of claim 20 wherein said first set of bits and said second of bits identify a respective customer providing said packets.

23. The node of claim 20 wherein said first set of bits and said second set of bits identify a respective node that originated said packets.

24. The node of claim 20 wherein said first set of bits and said second set of bits comprise multiple protocol label switching (MLPS) labels.

25. The node of claim 20 wherein said first set of bits and said second set of bits comprise virtual local area network (VLAN) labels.

26. The node of claim 20 wherein said first congestion algorithm and said second congestion algorithm are drop count algorithms that signify a respective percentage of said first packets and said second packets to be dropped prior to being stored in said queue.

27. The node of claim 26 wherein said drop count algorithms identify that every nth one of said first packets or second packets is to be dropped.

28. The node of claim 20 wherein said first congestion algorithm and said second congestion algorithm are selected based on an average occupancy of said first packets or said second packets in said queue.

29. The node of claim 28 wherein said average occupancy is determined by deriving a fraction of the instantaneous occupancy in said queue of said first packets or said second packets and adding a fraction of a prior average occupancy of said first packets or said second packets in said queue.

30. The node of claim 20 wherein said circuitry to drop packets drops every nth one of said first packets or said second packets before being stored in said queue.

31. The node of claim 20 wherein said first congestion algorithm and said second congestion algorithm are random early detection (RED) algorithms performed on aggregate flows of packets.

32. The node of claim 20 wherein said tables are located in a line card in said node.

33. The node of claim 20 wherein said tables are located in a ring card in said node.

34. The node of claim 20 wherein said first set of bits and said second set of bits identify a source node, and said first congestion algorithm and said second congestion algorithm allocate node bandwidth based on a source node for said packets.

* * * * *